(12) United States Patent
Bouvet et al.

(10) Patent No.: US 9,264,109 B2
(45) Date of Patent: Feb. 16, 2016

(54) DETECTION OF CHANGE IN GENERATED MAGNETIC FIELD DUE TO TAG-LOADING

(71) Applicant: ST-Ericsson SA, Plan-les-Ouates (CH)

(72) Inventors: Yoann Bouvet, Villeneuve Loubet (FR); Kanan Saurabh, Singapore (SG)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/372,052

(22) PCT Filed: Feb. 1, 2013

(86) PCT No.: PCT/EP2013/052025
§ 371 (c)(1),
(2) Date: Jul. 14, 2014

(87) PCT Pub. No.: WO2013/120707
PCT Pub. Date: Aug. 22, 2013

(65) Prior Publication Data
US 2014/0357190 A1    Dec. 4, 2014

Related U.S. Application Data

(60) Provisional application No. 61/602,932, filed on Feb. 24, 2012.

(30) Foreign Application Priority Data

Feb. 14, 2012   (EP) ..................................... 12305164

(51) Int. Cl.
*H04B 5/00*   (2006.01)

(52) U.S. Cl.
CPC ............ *H04B 5/0037* (2013.01); *H04B 5/0056* (2013.01); *H04B 5/0075* (2013.01); *H04B 5/0093* (2013.01)

(58) Field of Classification Search
None
See application file for complete search history.

(56) References Cited

U.S. PATENT DOCUMENTS

| 4,924,171 | A | 5/1990 | Baba et al. |
| 2001/0015697 | A1* | 8/2001 | Wuidart .................. 340/825.49 |
| 2006/0160515 | A1* | 7/2006 | Wong ............................ 455/280 |
| 2009/0045913 | A1* | 2/2009 | Nelson et al. ................ 340/5.66 |
| 2010/0133917 | A1* | 6/2010 | Sekino et al. ................. 307/104 |
| 2010/0171369 | A1 | 7/2010 | Baarman et al. |

(Continued)

FOREIGN PATENT DOCUMENTS

| EP | 2 330 753 A1 | 6/2011 |
| WO | 2011/067102 A1 | 6/2011 |

OTHER PUBLICATIONS

International Search Report issued in corresponding International application No. PCT/EP2013/052025, date of mailing May 10, 2013.

(Continued)

*Primary Examiner* — Alejandro Rivero
(74) *Attorney, Agent, or Firm* — Patent Portfolio Builders PLLC

(57) ABSTRACT

The invention concerns a Near Field Communication method comprising a step (1) of generating, by an antenna of a transmitter, a magnetic field (H), a step (2) of receiving, by an antenna of a tag, power from the generated magnetic field (H), then causing a drop in the generated magnetic field (H), wherein the method further comprises a step (3) of estimating the drop by sensing a voltage swing across said transmitter antenna.

13 Claims, 2 Drawing Sheets

(56) References Cited

U.S. PATENT DOCUMENTS

| | | |
|---|---|---|
| 2010/0181961 A1 | 7/2010 | Von Novak et al. |
| 2010/0311328 A1 | 12/2010 | Kargl et al. |
| 2012/0064826 A1* | 3/2012 | Darwhekar et al. ......... 455/41.1 |
| 2014/0002244 A1* | 1/2014 | Sirinamaratana et al. ... 340/10.1 |

OTHER PUBLICATIONS

Written Opinion of the International Searching Authority issued in corresponding International application No. PCT/EP2013/052025, date of mailing May 10, 2013.

* cited by examiner

DETECTION OF CHANGE IN GENERATED MAGNETIC FIELD DUE TO TAG-LOADING

TECHNICAL FIELD

The invention relates to the capacity of Near Field Communication (NFC) devices. More particularly the invention focuses on the ability of a Host to power a Tag through near field coupling of the antennas of both devices.

BACKGROUND

Near Field Communication is a wireless transmission technology that can transmit data at high speeds and over very short distances. The data exchange is performed by simply bringing close together two electronic devices, preferably a few centimeters; for example 10 centimeters or less. Near Field Communication is based on contactless Card and Radio Frequency Identification (RFID) technology.

Near Field Communication has a short read range typically limited to a range approximately equal to one wavelength. Actually, The Near Field signal decays as the cube of distance from the transmitter antenna.

A transmitter is a device that can read tags and write to them. This transmitter is also called a reader, because it can communicate with a tag through transmitting power and data to this tag, as well as through receiving data from this tag. To be able to communicate with passive tags, it generates an electromagnetic field from which the passive tag gets its energy. In a passive system, the transmitter transmits an energy that wakes up the tag and powers its chip, enabling it to transmit or store data.

A tag is a data carrier that can be read and possibly written using radio technology. Tags can comprise a battery or they can be passive. When tags are passive, they do not have their own power supply and are powered by the electromagnetic field of the transmitter. During the reading, the tag modulates the magnetic field and transmits the data by modulating the magnetic field.

An antenna is a conductive structure specifically designed to couple or radiate electromagnetic energy. Antenna structures, often encountered in NFC systems, may be used to both transmit and receive electromagnetic energy, particularly data-modulated electromagnetic energy. This method of communicating data between tags and readers in which information is carried through changes in the magnetic field created by the transmitter antenna uses inductive coupling between a transmitter antenna and a tag antenna.

In a communication process, the transmitter antenna transmits the electromagnetic energy to activate or awaken the tag, realizes the data transfer and sends the instructions to the tag. Meanwhile, the reader antenna receives information from the tag. The tag ability to efficiently extract energy from the transmitter field is based on the electrical resonance effect. Tag antenna element is designed to resonate at transmitter antenna operating frequency.

A transmitter communicates with a passive tag and powers it using the same signal. The fact that the same signal is used to transmit power and communicate data implies that any modulation of the signal causes a reduction in the power transmitted to the tag.

The powering of passive tags and the communication with those passive tags with the same communication signal places restrictions on the functionality and transactions the tags are capable of First, very little power is available to the digital portion of the integrated circuit on the tag, thus limiting the functionality of the tag. Second, the length of transactions with the tag is limited to the time for which the tag is expected to be powered and within communication range.

Actually, a big amount of the magnetic field generated by the transmitter is consumed by the simple entrance of a tag in the transmitter antenna field area. There is a drop in the magnetic field generated.

In a first prior art, for example described in the patent application U.S. Pat. No. 4,924,171, it is proposed to drive the transmitter generation of magnetic in accordance with the level of the signal of a tag. This drive takes place once the communication has been established between the tag and the reader. Active participation from tag through signal sending is needed for management of transmitter emitting power.

In a second prior art, for example described in the patent application WO2011067102, it is also introduced a contactless system in which the transmitter adapts the electromagnetic power level to the needs of a tag. In this document, there is a current associated to a level of magnetic field which is measured. The power extension request and information data from the tag are coded in different ranges. Here also, the process takes place once the communication has been established between the tag and the transmitter. Active participation from tag through message sending is needed for management of transmitter emitting power.

The issue of the management of the drop caused by the tag in the transmitter magnetic field is not tackled. This issue is all the more important as it is a requirement of the NFC standards. For example, the ISO14443 standard requires for the resulting magnetic field by the transmitter to range from 1.5 A/m to 7.5 A/m.

The strength of the field generated by the transmitter is classified into two kinds The loaded field corresponds to the field when a tag is present in the transmitter field. The unloaded field corresponds to the field when no tag is present in the transmitter field.

Managing the drop is all the more critical as both modes have to be taken into account.

In general, with smaller antennas, there is a lower radiation resistance and a lower efficiency. Managing the drop is all the more challenging as there is a need to use smaller antennas in NFC systems for saving space reasons. This will help to obtain a size for transmitters and tags which is smaller and smaller.

SUMMARY

The object of embodiments of the present invention is to alleviate at least partly the above mentioned drawbacks.

More particularly, embodiments of the invention aim to provide a NFC method which can measure this magnetic field generation drop due to tag presence in a rather simple way, at transmitter level, and preferably at transmitter level only without any active participation of the tag to this drop estimation.

According to embodiments of the invention, preferably, this method also aims at compensating for the magnetic field generation drop. This way, smaller size antennas can be used, providing a limited generated magnetic field for tags, and compensating for magnetic field generation drop due to tag presence which otherwise would have driven to a generated magnetic field with a too low level.

According to embodiments of the invention, more precisely, the NFC method focuses on the period before any operation mode has started, just as the tag enters the reader field area. The NFC method can serve as a means to facilitate the installation of the communication between reader and tags.

This object is achieved with a Near Field Communication method comprising a step of generating, by an antenna of a transmitter, a magnetic field, a step of receiving, by an antenna of a tag, power from said generated magnetic field, then causing a drop in said generated magnetic field, wherein said method further comprises a step of estimating said drop by sensing a voltage swing across said transmitter antenna.

Preferred embodiments comprise one or more of the following features:
- said method further comprises a step of driving said transmitter's output power so as to compensate at least partly for said drop.
- said generating step generates a magnetic field ranging from 1.5 A/m to 7.5 A/m, in absence of said tag, said driving step compensates for said drop so that compensated magnetic field ranges from 1.5 A/m to 7.5 A/m, in presence of said tag.
- said driving step compensates for said drop so that compensated magnetic field stays fixed, in presence of said tag.
- said estimating step separates, in sensed voltage swing across said transmitter antenna, the signal representative of said drop from the signal representative of the information transmitted by said tag.
- said separation is performed by heterodyne detection or by homodyne detection.
- said voltage swing across said transmitter antenna is sensed by differentiating voltages received at its two receiver pins.

This object is also achieved with a Near Field Communication transmitter comprising a transmitter antenna adapted to generate a magnetic field, a sensor adapted to sense voltage swing across said transmitter antenna caused by a drop in said generated magnetic field due to power transfer to a tag antenna, wherein said transmitter further comprises an estimator adapted to estimate said drop from said sensed voltage swing.

Preferred embodiments comprise one or more of the following features:
- said transmitter further comprises a driver adapted to drive transmitter output power so as to compensate at least partly for said drop.
- said transmitter is adapted to generate a magnetic field ranging from 1.5 A/m to 7.5 A/m, in absence of a tag, adapted to compensate for said drop so that compensated magnetic field ranges from 1.5 A/m to 7.5 A/m, in presence of a tag.
- said transmitter is adapted to compensate for said drop so that compensated magnetic field stays fixed, in presence of a tag.
- said transmitter estimator is adapted to separate, in sensed voltage swing across said transmitter antenna, the signal representative of said drop from the signal representative of an information transmitted by a tag.
- said transmitter estimator includes a heterodyne detector or a homodyne detector.
- said transmitter antenna is a 4-pins transmitter including two receiver pins and two transmitter pins.
- said transmitter comprises capacitors connected to said pins, and wherein capacitance values of capacitors connected to receiver pins are at least 10 times, preferably at least 20 times, more preferably at least 50 times, smaller than capacitance values of capacitors connected to transmitter pins.

DETAILED DESCRIPTION OF THE EMBODIMENTS OF THE INVENTION

Figure 1:
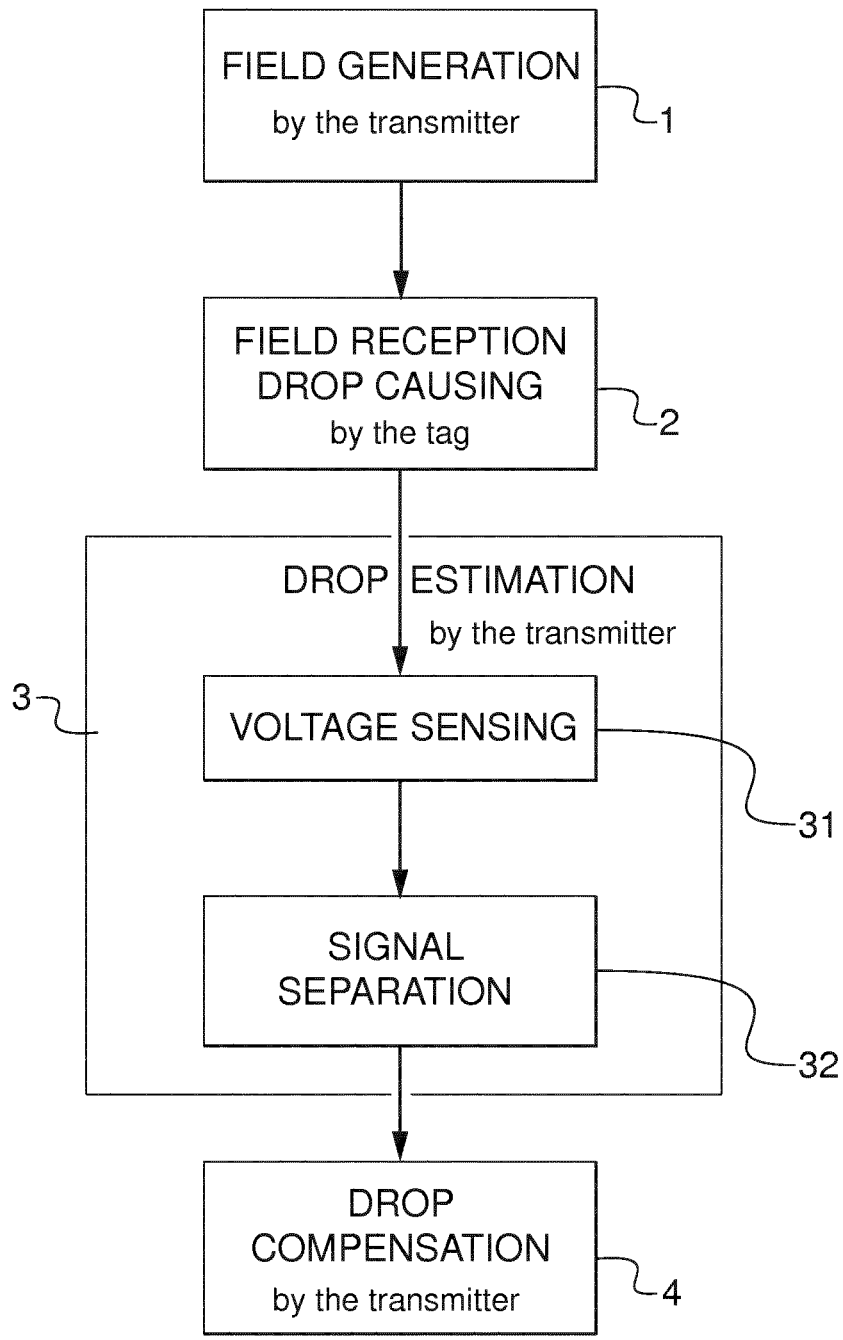
FIG. 1 shows an example of a diagram illustrating the Near Field Communication method according to some embodiments of the invention.

FIG. 1 shows an example of a diagram illustrating the Near Field Communication method according to some embodiments of the invention. This Near Field Communication method comprises a first step 1 of field generation by the transmitter, a step 2 of field reception and drop causing by the tag, a step 3 of drop estimation by the transmitter. Within the step 3 of drop estimation, there are two sub-steps which are the sub-step 31 of voltage sensing and the sub-step 32 of signal separation by the transmitter. Finally, this Near Field Communication method comprises a step 4 of drop compensation by the transmitter.

Referring to FIG. 1, in the step 1, the antenna of the transmitter generates a magnetic field. There is no tag present in the vicinity of the transmitter.

In step 2, the antenna of the tag then receives power from that generated magnetic field and thereby causes a drop in the magnetic field generated by the transmitter antenna. This can imply for example a fall in the currents through the transmitter antenna and possibly a reduction in the resulting field strength generated by the transmitter.

In the estimation step 3, the drop is estimated by the transmitter. Within step 3, the NFC method comprises a sub-step 31 of voltage sensing. The transmitter continuously generates a radio frequency carrier wave. During the electromagnetic induction, voltage is produced across conductors situated in the changing magnetic field. The transmitter antenna behaves as an inductor, by storing energy in the magnetic field. All the energy used in the tag is extracted from the coil of the transmitter antenna.

Actually, a part of the magnetic field emitted by the reader penetrates the antenna coil of the transponder which is the tag. By induction, a voltage is generated in the tag antenna coil. This voltage serves as the power supply for the tag chip. Measurement of this voltage would allow for an estimation of the level of magnetic field available around the tag antenna. But this voltage is not measured in the present method. On the contrary, the drop in magnetic field will be estimated by sensing the voltage only across transmitter antenna.

In the estimation step 3, the NFC method also comprises a sub-step 32 of separation, in sensed voltage swing across the transmitter antenna, of the signal representative of the drop in generated magnetic field from the signal representative of the information transmitted by the tag through modulation of the generated magnetic field.

There are two signals from the tag to be separated within the reader. In the reader which also is the transmitter, to get the data coming from the tag, the voltage measured at the reader antenna is rectified. This represents the demodulation of an amplitude modulated signal.

If a resonant tag with the transmission frequency of the reader is placed within the magnetic field of the reader antenna, then this draws energy from the magnetic field. This additional power consumption can be measured as voltage drop in the reader antenna through the variation of the current supplied to the reader antenna. The drop of the voltage due to the tag entering the magnetic field generated by the transmitter is far more important in intensity than the voltage modulation by the data sent from the tag.

In the voltage swing sensed across transmitter antenna, the signal representative of the drop caused by the tag entering the magnetic field generated by the transmitter can be of a relatively high intensity. The signal representative of the information due to data modulation of the magnetic field generated by the tag is comparatively far smaller in intensity.

It is another preferred feature of the NFC method to add a further step 4 for measuring this reduction of the generated magnetic field so as to compensate at least partly for the drop caused by the tag entering this generated magnetic field. The NFC method proposes to drive the transmitter output power with intelligence, which means as a function of the drop caused by the tag, as opposed to blindly drive it as can be seen in some prior arts.

The magnetic field generation can be adapted to range from 1.5 A/m to 7.5 A/m, in absence of said tag.

The compensation is useful so as to keep magnetic field generated within the inferior and the superior limits specified above. If, in the absence of a tag, the magnetic field can be kept under a superior bound which is 7.5 A/m, in the presence of a tag and when undergoing a drop in its magnetic field, the transmitter will compensate for this drop in order to be able to keep this generated magnetic field above the minimum of 1.5 A/m. The compensation driving can be adapted so that compensated magnetic field ranges from 1.5 A/m to 7.5 A/m, in presence of said tag too.

In the un-loaded field situation, there is no tag in the magnetic field generated by the transmitter. No amount of generated magnetic field has been consumed. The level of the magnetic field across the transmitter antenna is at its maximum. In this case, one can think of using big antennas and generating an amount of magnetic field which is high enough. In case there is a tag coming in the vicinity of the transmitter then causing a resulting drop in the generated magnetic field, the level of magnetic field available could still be above the inferior limit. But this solution presents some drawbacks. Firstly the importance of the resulting drop is not always predictable, indeed one cannot be sure that the resulting magnetic field will stay above the inferior threshold. Secondly the level of the resulting un-loaded field could then be above the superior threshold. Besides, this contemplated solution would need use of big antennas, what also presents the drawback of being cumbersome.

In the loaded field, there is a tag present. If the level of magnetic field across the transmitter antenna is not high, for example because the transmitter uses a small antenna, then the resulting drop in the magnetic field could cause the resulting amount of magnetic field available across the transmitter antenna to fall down under the inferior limit very easily.

As a preferred embodiment, the compensation driving is adapted so that compensated magnetic field stays fixed in presence of the tag, which means that the generated magnetic field stays at a level after compensation in presence of the tag which is the same or roughly the same than at the level it was before entering of the tag. So the drop caused by the tag entering the magnetic field generated by the transmitter, is that way exactly or practically exactly compensated. Indeed, the loaded magnetic field, once the tag has come in the vicinity of the transmitter, will have the same value or a similar value to the unloaded magnetic field existing before appearance of the tag.

For example, the separation between the drop voltage and the data voltage can be performed by heterodyne detection or by homodyne detection.

Preferably, the voltage swing across the transmitter antenna is sensed by differentiating the voltages received at its two receiver pins.

With the method described here, more intelligence is brought into the transmitter so that it can automatically react to the drop in its generated magnetic field caused by the entrance of a tag in its vicinity. Preferably, its reaction will tend to compensate for this drop, preferably completely or at least partly.

In general, the smaller the antenna is, the lower the radiation resistance is and the lower the efficiency is. The compensation of the drop in the magnetic field generated by the transmitter facilitates the use of smaller antennas with respect to the constraint of not going below the minimum threshold of 1.5 A/m. Thus the method disclosed here increases the ability of a transmitter to power a tag through near field magnetic coupling of the antennas, while using smaller antennas. For example, a small antenna may be about less than 5 cm2, whereas a big antenna may be about more than 10 cm2.

The compensation can be made in such a way that the generated magnetic field stays fixed. As the exact level of magnetic field is known, at least indirectly through voltage across transmitter antenna sensing, it can be compensated exactly so as to have a constant level measured. Preferably, this constant level can be maintained through the use of a correction circuitry.

Therefore the proposed method will help not only to be compliant to standards, notably the ISO14443 standard, but it will help also to transfer more power to the tag without compromising on the specifications in required loaded field as well as in required un-loaded field.

The same method would of course be applicable for different values of the bounds of the magnetic field that is to be generated by the transmitter.

Figure 2:
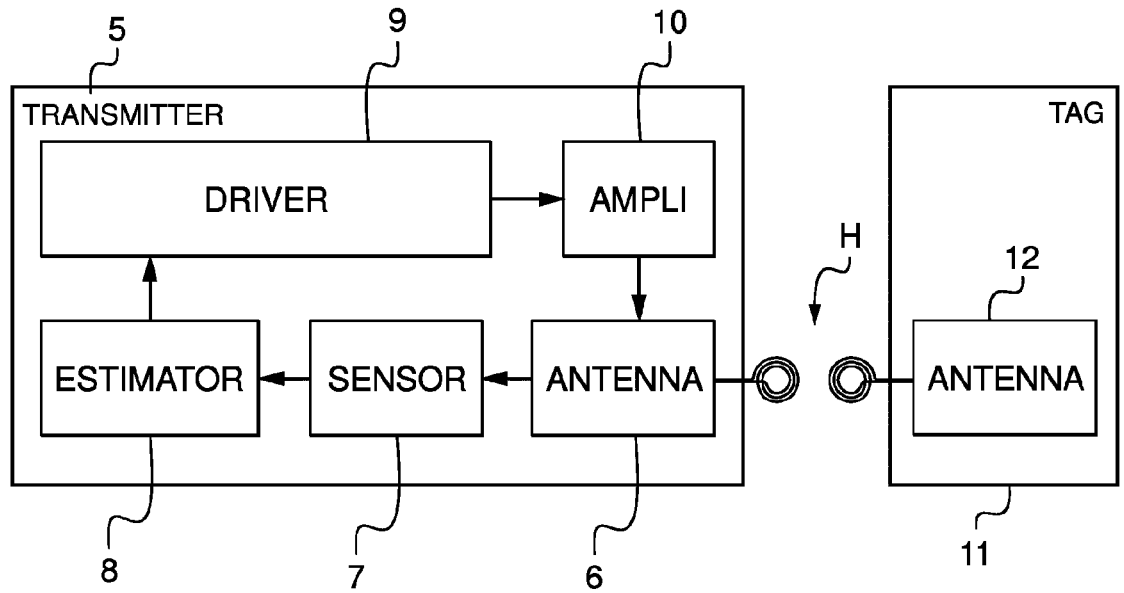
FIG. 2 shows a diagram to illustrate the functional blocks included in a transmitter and their interaction, according to some embodiments of the invention.

FIG. 2 shows a diagram to illustrate the functional blocks included in a transmitter and their interaction according to some embodiments of the invention. The transmitter shown in FIG. 2 may be used to fulfill the steps of the communication method shown in FIG. 1.

A transmitter 5 comprises a transmitter antenna 6, a sensor 7, an estimator 8, a driver 9, and an amplifier 10. A tag 11 comprises a tag antenna 12.

The Near Field Communication transmitter 5 comprises a transmitter antenna 6 adapted to generate a magnetic field H. There is an inductive coupling between the transmitter antenna 6 and the tag antenna 12 so that the magnetic field H generated by the transmitter 5 is used to power the tag 11 and to communicate with the tag 11.

The Near Field Communication transmitter 5 further comprises a sensor 7 adapted to sense voltage swing across the transmitter antenna 6 caused by a drop in the generated magnetic field H due to power transfer to a tag antenna 12. The sensor 7 is adapted to sense the voltage across the transmitter antenna 6. More particularly, the sensor 7 is adapted to sense the voltage swing across the transmitter antenna 6.

The Near Field Communication transmitter 5 also advantageously comprises an estimator 8. The transmitter estimator 8 is adapted to separate, in sensed voltage swing across the transmitter antenna 6, the signal representative of the drop caused in generated magnetic field from the signal representative of the information transmitted by the tag 11 through modulation of the generated magnetic field. The estimator 8 is adapted to estimate the drop only due to proximity of the tag 11, by processing the sensed voltage swing. The estimator 8 is adapted to indirectly estimate the drop in generated magnetic field due to the tag 11 entering the vicinity of the transmitter 5. In fact, the estimator 8 is adapted to estimate the voltage drop across the transmitter antenna 6 that is due to the proximity of the tag 11. By analysing the voltage swing across the transmitter antenna 6 that has be sensed by the sensor 7, the estimator 8 will estimate the voltage drop due to the proximity of the tag 11. It is this voltage drop that has to be compensated for. To allow for drop estimation, the estimator 8 may include either a heterodyne detector or a homodyne detector.

The Near Field Communication transmitter 5 further comprises a driver 9 adapted to drive transmitter 5 output power so as to compensate at least partly for the drop caused in the generated magnetic field H by the tag 11 proximity. For magnetic field generation by the transmitter 5, the driver 9 drives the amplifier 10 which in turn drives the transmitter antenna 6. So the signal to be transmitted to the tag 11 is amplified before being emitted by the transmitter antenna 6. So the driver 9 manages the variations of the output power of the amplifier 10 which in turn manages the variations of the magnetic field H generated by the transmitter antenna 6. Here, the driver 9 will also manage the driving of the amplifier 10 to compensate for the voltage drop across the antenna 6, or to at least compensate partially for this voltage drop.

The resulting magnetic field H available across the transmitter antenna 6 can comply with a minimum value and a maximum value fixed by standards, for example for the ISO14443 standards, the range value is preferably from 1.5 A/m to 7.5 A/m. What can be feared is that the drop in the magnetic field H caused by the tag 11 as it enters the transmitter 5 vicinity can be so important that the resulting magnetic field across the transmitter antenna falls down below the minimum value.

Here, the driver 9 drives the amplifier 10 in such a way that the magnetic field generation can be adapted to range from 1.5 A/m to 7.5 A/m, in absence of said tag. Then, the driver 9 also drives the amplifier 10 in such another way that the compensation driving can be adapted so that compensated magnetic field ranges from 1.5 A/m to 7.5 A/m, in presence of said tag.

The transmitter 5 creates a magnetic field H between the transmitter 5 and the tag 11 and this induces an electric current in the tag antenna 12. This current is used to power the integrated circuit (not shown) of the tag 11. The response is given to the transmitter 5 by varying the load on the tag antenna 12 coil. As a consequence, this variation changes the current in the transmitter antenna 6 coil. It operates in free spectrum space, at a frequency of 13.56 MHZ which is an unregulated frequency band.

The impedance match between the tag antenna 12 and the tag integrated circuit helps the tag circuit to operate well on the chip, notably to maximize the power transfer between the antenna 12 and the chip of the tag 11.

The use of an optimized transmitter antenna 6 can facilitate the step of estimation. Preferably, a 4-pin antenna system will be used, which is described with more details in FIG. 3.

Figure 3:
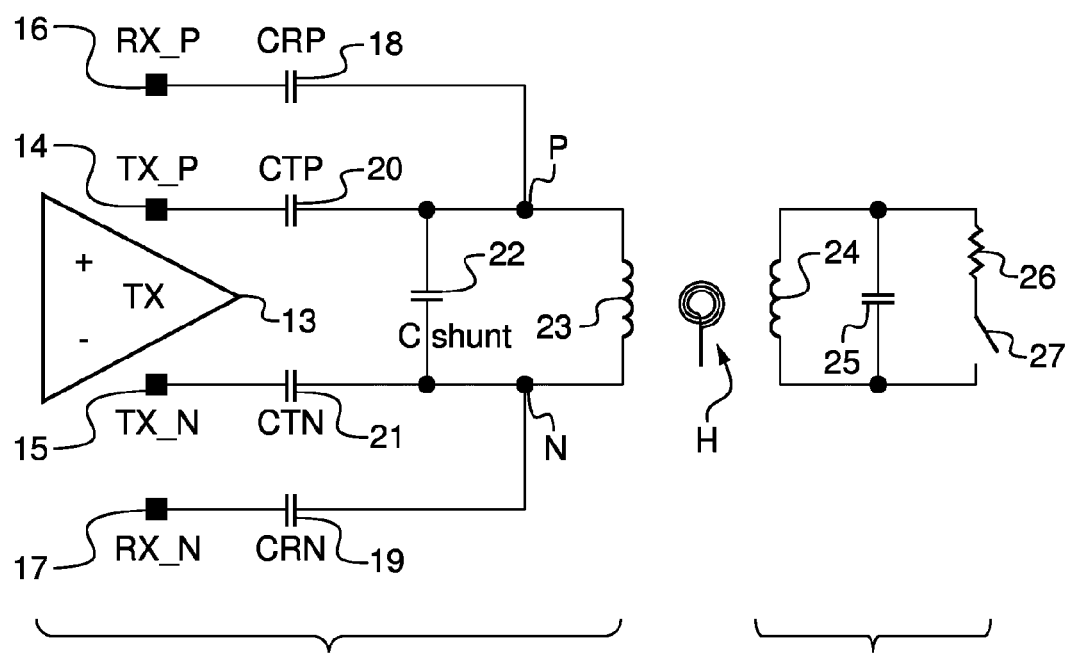
FIG. 3 shows an embodiment of a 4-pin antenna system of a transmitter according to some embodiments of the invention.

FIG. 3 shows a preferred embodiment of a 4-pins antenna system of a transmitter 5 according to some embodiments of the invention. This transmitter antenna system is a 4-pins antenna system including two receiver pins 16 which is a RX_P pin and 17 which is RX_N pin as well as two transmitter pins 14 which is a TX_P pin and 15 which is TX_N pin.

Transmitter antenna 6 comprises an inductor coil element 23 which is connected to a first node P and to a second node N. A capacitor 18 presenting a capacitance value of CRP and the receiver pin 16 are connected in series from the node P. A capacitor 19 presenting a capacitance value of CRN and the receiver pin 17 are connected in series from the node N. A capacitor 20 presenting a capacitance value of CTP and the transmitter pin 14 are also connected in series from the node P. A capacitor 21 presenting a capacitance value of CTN and a transmitter pin 15 are also connected in series from the node N. The transmitter pins 14 and 15 are also connected to the outputs of an amplifier 13. A shunt capacitor 22 presenting a capacitance value of Cshunt is connected between the nodes P and N in parallel to the inductor coil 23.

For example, the capacitances values CTP and CTN of capacitances 20 and 21 can be 100 pF, the capacitances values CRP and CRN of capacitances 18 and 19 can be 2 pF, the capacitances value1 Cshunt of capacitance 22 can be 20 pF. Other values of capacitances may be used.

A tag 11 comprises an antenna 12 including an inductor coil 24, a capacitance 25 connected in parallel to the inductor coil 24, a resistor 26 and a switch 27 in series and connected in parallel to the capacitance 25.

This antenna system may be used to perform the NFC method described in FIG. 1.

The antennas coils are the inductor 23 for the transmitter 5 and the inductor 24 for the tag 11. When the tag 11 enters the magnetic field H generated by the transmitter inductor coil 23, the inductor coil 24 of tag 11 takes power from the magnetic field H, starting to load the inductor coil 23 of transmitter antenna, thereby reducing the voltage swing across inductor coil 23. The LC tank of the tag 11, comprising inductor 24 and capacitance 25, is resonant at a different frequency than the transmitter 5 LC tank which comprises inductor 23, and other transmitter capacitances. This difference in resonance frequency between transmitter 5 and tag 11 affects the resonance of the transmitter 5 and detunes the transmitter 5. This leads to a fall in current through the transmitter antenna's inductor coil 23. As a consequence, the generated magnetic field H will drop.

The voltage across the pins 16 and 17 is a function of the voltage swing across the inductor coil 23. As explained before, the magnetic drop can be deducted from this sensed voltage. Besides, in case of a direct conversion receiver part being used to sense load modulation by tag 11 in the transmitter 5 also called reader, the load field strength can be estimated simply by looking at the DC component of the signal received across receiver pins 16 and 17, after this signal has been mixed with the local oscillator of the transmitter 5. There are relationships between sensed voltage and generated magnetic field. So measuring the voltage between the pins 16 and 17 allows for deducting the voltage across the antenna inductor 23, what in turn can lead to know the level of the generated magnetic field in the vicinity of the transmitter 5. The information contained in the induced voltage across antenna coil 23 can be collected at the pins 16 and 17 which usually serve to sense the signal containing data coming from the tag 11 after the signal has been modulated by the tag 11 in order to include this data information. The pins 16 and 17 are given a new functionality which is to sense the drop in the generated magnetic field caused by the presence of the tag 11 in the generated magnetic field area which is located in the vicinity of transmitter antenna's inductor coil 23.

Preferably, signal separation methods are used to discriminate between the drop in the magnetic field voltage caused by the tag presence and the data information voltage due to the data coming from the tag 11. To perform this discrimination, in an option, homodyne detection or heterodyne detection can be used.

According to the architecture of the 4-pin antenna system of the transmitter 5 of FIG. 3, the voltage induced across the antenna 23 is directly available through the two receiver pins 16 and 17 and the loaded magnetic field strength can be gauged simply by looking at the direct current. Preferably, a drop of voltage across the inductor coil 23 is directly compensated for, without effective estimation of the corresponding drop in loaded magnetic field, because the reference voltage across inductor coil 23 corresponding to the wanted loaded magnetic field is known at the transmitter 5 level.

The capacitors 20 and 21 are composing the matching network of the transmitter antenna. This means that they aim at adapting the 4-pin antenna system internal impedance so as to have the most efficient transfer of power between the transmitter antenna 6 and the tag antenna 12.

The capacitances of the capacitors 18 and 19 connected to the receiver pins 16 and 17 are at least 10 times, preferably at least 20 times, more preferably at least 50 times smaller than the capacitances of capacitors 16 and 17 connected to the transmitter pins 14 and 15, so as to limit their disturbance on the capacitors 20 and 21 which help transmitting power from the amplifier 13 to the inductor coil 23 of transmitter antenna.

The invention has been described with reference to preferred embodiments. However, many variations are possible within the scope of the invention.

The invention claimed is:

1. A Near Field Communication method comprising:
generating, by an antenna of a transmitter, a magnetic field;
receiving, by an antenna of a tag, power from the generated magnetic field which causes a drop in the magnetic field;
estimating the drop in the magnetic field, wherein estimating the drop in the magnetic field further comprises:
sensing a voltage swing across the transmitter antenna; and
separating a first signal representative of a drop in the magnetic field from a second signal representative of information transmitted by the tag through modulation of the magnetic field; and
compensating at least partly for the drop in the magnetic field based on the first signal.

2. A Near Field Communication method according to claim 1 further comprising,
driving said transmitter's output power so as to compensate at least partly for said drop in magnetic field resulting in a compensated magnetic field.

3. A Near Field Communication method according to claim 2, wherein:
the generated magnetic field ranges from 1.5 Nm to 7.5 Nm, in absence of said tag, and
the compensated magnetic field ranges from 1.5 Nm to 7.5 Nm, in presence of said tag.

4. A Near Field Communication method according to claim 2 further comprising,
driving said transmitter's output power so as to compensate at least partly for said drop in magnetic field so that the compensated magnetic field stays fixed, in presence of said tag.

5. A Near Field Communication method according to claim 1, wherein said separation is performed by heterodyne detection or by homodyne detection.

6. A Near Field Communication method according to claim 1, wherein said voltage swing across said transmitter antenna is sensed by differentiating voltages received at its two receiver pins.

7. A Near Field Communication transmitter comprising; a transmitter antenna configured to generate a magnetic field;
a sensor configured to sense a voltage swing across the transmitter antenna caused by a drop in the magnetic field caused by a tag antenna configured to receive power from the magnetic field;
the transmitter configured to estimate the drop in the magnetic field, wherein estimating the drop in the magnetic field includes sensing a voltage swing across the transmitter antenna and separating a first signal representative of a drop caused by the tag antenna entering the magnetic field from a second signal representative of information transmitted by the tag through modulation of the magnetic field; and the transmitter configured to compensate at least in part for the drop in the magnetic field based on the first signal.

8. A Near Field Communication transmitter according to claim 7, wherein said transmitter further comprises a driver adapted to drive transmitter output power so as to compensate at least partly for said drop in magnetic field resulting in a compensated magnetic field.

9. A Near Field Communication transmitter according to claim 8, wherein said transmitter is:
adapted to generate a magnetic field ranging from 1.5 Nm to 7.5 Nm, in absence of a tag,
adapted to compensate for said drop so that the compensated magnetic field ranges from 1.5 A/m to 7.5 Nm, in presence of a tag.

10. A Near Field Communication transmitter according to claim 8, wherein said transmitter is adapted to compensate for said drop so that the compensated magnetic field stays fixed, in presence of a tag.

11. A Near Field Communication transmitter according to claim 7, wherein said transmitter includes a heterodyne detector or a homodyne detector.

12. A Near Field Communication transmitter according to claim 7, wherein said transmitter antenna is a 4-pins transmitter including two receiver pins and two transmitter pins.

13. A Near Field Communication transmitter according to claim 12, wherein said transmitter comprises capacitors connected to said pins, and wherein capacitance values of capacitors connected to receiver pins are of between 10 times, and 50 times, smaller than capacitance values of capacitors connected to transmitter pins.

* * * * *